March 9, 1937. R. S. HOPKINS 2,073,304
PRINTING MACHINE NEGATIVE CARRIER
Original Filed Nov. 2, 1934
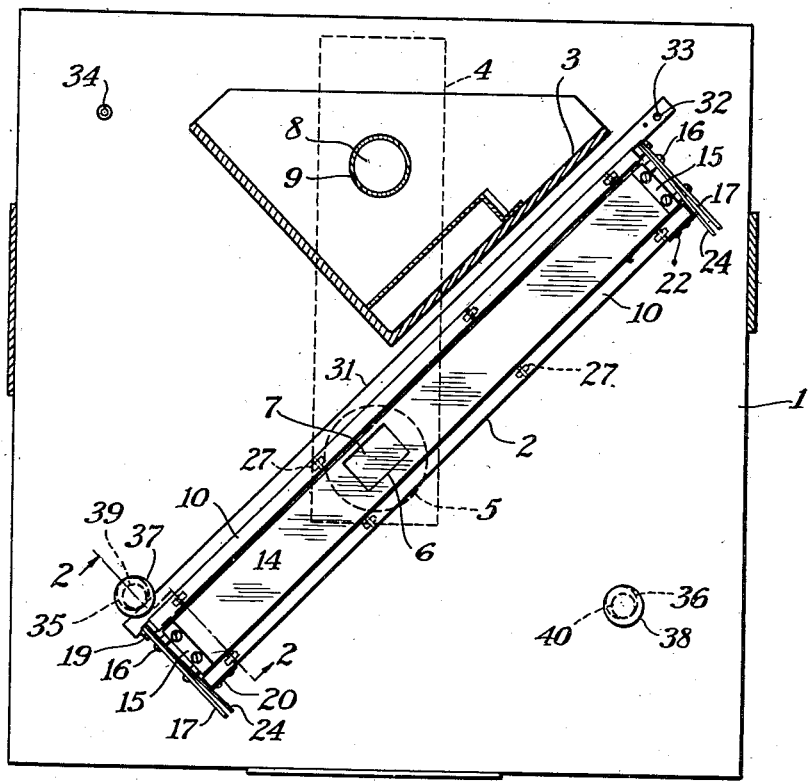
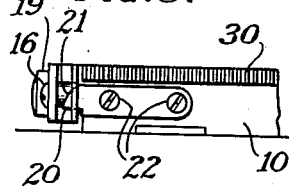
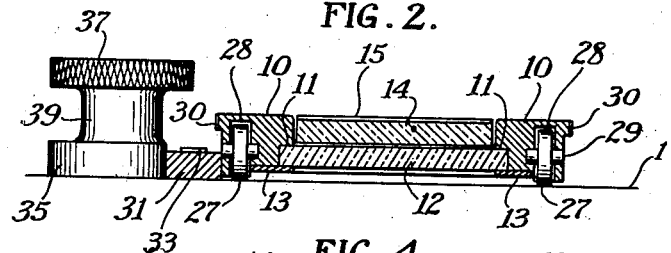
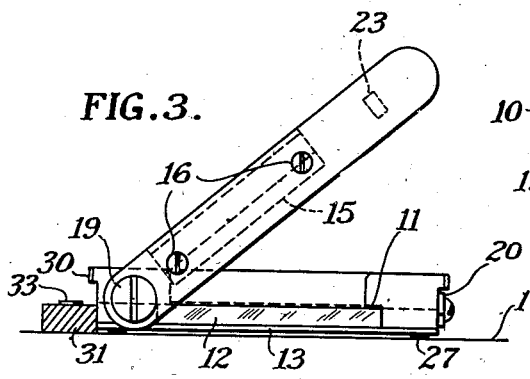
INVENTOR.
Roy S. Hopkins
BY
ATTORNEYS Patented Mar. 9, 1937

2,073,304

UNITED STATES PATENT OFFICE 2,073,304

PRINTING MACHINE NEGATIVE CARRIER

Roy S. Hopkins, Rochester, N. Y., assignor, by mesne assignments, to Eastman Kodak Company, Jersey City, N. J., a corporation of New Jersey Original application November 2, 1934, Serial No. 751,165. Divided and this application April 2, 1935, Serial No. 14,330

9 Claims. (Cl. 88—24)

This invention relates to photography and particularly to a means for rapidly positioning exposure areas of a negative for printing. One object of my invention is to provide a negative carrier which can be quickly and easily loaded with a strip of film bearing a plurality of picture areas. Another object of my invention is to provide a printing machine with a flat top or runway on which a negative carrier can be rapidly moved to position various exposures of a negative held by the carrier. Another object of my invention is to provide a guide-way for the negative carrier, which will direct its movement across an exposure aperture. Another object of my invention is to provide an exposure aperture and negative carrier so arranged that negatives that run lengthwise or crosswise of a film can be readily cared for. Still another object of my invention is to provide a simple means of adjusting a guide for a negative carrier and for moving a negative carrier with respect to an exposure aperture. Other objects will appear from the following specification, the novel features being pointed out in the claims at the end thereof.

In making photographic prints and particularly in making prints by projection of small negatives, in order to make such prints economically, it is necessary to provide a means for holding a negative preferably in strip form so that the various exposure areas can be rapidly and accurately positioned for printing.

In my copending application Serial No. 751,165 for Enlarging printer, filed November 2, 1934, of which the present application is a division, I have shown a complete printing machine particularly designed for making large size prints rapidly from small negatives.

The present application is particularly directed to the negative carrier and the means for rapidly adjusting it to bring the various exposure areas over the printing aperture.

Coming now to the drawing, wherein like reference characters denote like parts throughout:

Fig. 1 is a top plan view of printing machine including an exposure aperture and a negative holder and guide constructed in accordance with and embodying a preferred form of my invention.

Fig. 2 is a fragmentary section taken on line 2—2 of Fig. 1.

Fig. 3 is an end elevation of the negative holder in a partially open position showing also the relation of the negative holder to the guide-rail.

Fig. 4 is an enlarged fragmentary plan view of the negative holder showing the latch arrangement by which the hinged cover plate may be held in a closed position to hold a film flat.

Fig. 5 is a fragmentary detail side elevation of the end of the negative holder.

In accordance with a preferred form of my invention, a printing machine may be provided with a table top 1 which has a flat surface upon which a negative holder designated broadly as 2 may move. The table top 1 may also support a bracket 3 shown in section, this bracket being adapted to carry the platen and other mechanism fully shown in my copending application above referred to. Beneath the table top there is mounted a lamp-house 4, at one end of which there is provided an opening 5 which may be partially covered by a masking 6 with an opening 7, through which light may be projected upwardly by a suitable optical system fully shown and described in my copending application above referred to and also in my copending application Serial No. 14,329, filed April 2, 1935. The table top 1 likewise carries an opening 8 in which a chimney 9 is mounted for carrying off the heat from the printing lamp.

Coming now to the negative holder, I prefer to construct this of a pair of parallel bars 10 which are rabbeted at 11 to receive a plate of glass 12, this glass being held in position by means of plates 13 attached to members 10. The glass 12 should be of the plate glass variety and it is of an elongated shape, adapted to receive a strip of film bearing a plurality of exposure areas.

In order to hold a film flat on the plate 12, I provide a second plate 14, which is hingedly mounted with respect to plate 12 as indicated in Fig. 4. The ends of the plate 14 are supported by metallic cross-bars 15, into which studs 16 are attached, these studs being passed through the handle 17 and through spacing washers 18. The handle 17 is pivotally mounted at 19 upon a stud passing into one of the side rails 10. Thus, by swinging the handles 17 upon their studs 19, plates 14 and 12 are separated or brought together as the case may be.

In order to hold the cover plate 14 closed, I provide a latch element consisting of a hooklike member 20 having upper tapering edge 21, attached by screws 22 to an element 10. This hook is adapted to engage an aperture 23 carried by the spring latch plate 24, this latch plate being attached to handle 17 by the studs 18 and 19 and being apertured at 25 to pass about the spacer 18. Thus, by pressing the spring in the direction shown by the arrow in Fig. 4, the cooperating elements 20 and 23 are released and plate 14 may be moved relative to plate 12.

In each of the side rails 10, as best shown in Fig. 1, there are mounted a plurality of rollers 27. These rollers are carried in suitable grooves 28 in members 10, as shown in Fig. 2, and they may turn upon suitable trunnions 29. Thus, the negative holder 2 can roll in a direction longitudinal to its length very readily and somewhat resist movement transversely of its length. Each of the members 10 is provided with a knurled edge 30, which forms a rough surface, by which the negative holder can be conveniently manipulated.

In order to guide the negative holder accurately and rapidly over the flat surface 1 of the table top, I provide a rail 31 which is provided with an aperture 32 in one end to receive a pin 33 or 34, upon which the rail may turn. In order to adjust the angular relation of the rail to the exposure aperture 7, there is a cam 35 or 36 carried by a knurled handle 37 or 38, mounted to turn upon a post 39 or 40, carried in the table top. Thus, by turning a knurled handle, the angle of the guide-rail 31, with respect to the opening 7 can be readily adjusted.

The reason for having two studs 33 and 34 to support the rail 31 is that one stud 33 may be used when the negatives run lengthwise of a film to be held in the film holder and the opposite stud 34 may be used when the exposure areas run transversely of the film. Both types of film in miniature sizes are now on the market. For the same reason, two adjusting knobs 37 and 38 are employed, although it is, of course, understood that only one knob and one pin are used at a time.

The operation of this device is extremely simple. After selecting a strip of negatives with the exposure areas running lengthwise of the film, the operator swings plate 14 of the negative holder from plate 12 by means of the handles 17 and the latches 24 arranged at each end of the negative holder. The negative is then passed between these plates and the holder is closed by moving the handle 17 downwardly until the cooperating latch elements 20 and 23 come into contact. It might be here pointed out that the advantage of having handles 17 at each end of the negative holder is that the operator's fingers will not come in contact with either of the glass plates 14 or 12 during the loading operation and, consequently, finger-marks will be largely eliminated.

After the negative has been placed in the holder, the holder is slid up against the guide-rail 31 and, if the exposure frames on the film do not properly register with the light opening 7, a knurled knob 37 may be turned until the film does properly register. For a complete description of how the negative may be registered with the exposure opening, reference may be had to my copending application Serial No. 751,165.

The operator then merely slides the negative holder a distance equal to each exposure frame, each time an exposure is made, so that the negative carrier 2 is made to roll over the flat table top 1.

It should be noted that the negative holder is provided with a plurality of rollers 27, so that when the end of the negative holder may project from the flat table top 1 in making an exposure from one of the exposure areas at the end of a film, the frame will have a sufficient number of rollers still on the table top to properly position the negative holder.

With a machine as above described, the negative is always held in the proper focal plane, because the corresponding glass plate 12 is positioned a fixed distance above the table top 1 to properly position the film relative to the rest of the projection printer which is shown in my copending application Serial No. 751,165.

A negative holder which may receive an entire strip of film bearing a plurality of exposures can, of course, be handled much more rapidly than the usual type of negative holder, because it is only necessary to load the holder once with each strip of film to be printed. Moreover, the various separate exposure areas can be rapidly exposed by moving the negative holder upon its rollers the distance of one exposure area and, since the negative holder is guided in its movement by the guide rail, it is a simple matter to successively expose each of the areas on a strip of film carried by my improved type of holder.

While I have shown and described a preferred embodiment of my invention, it is obvious that changes in construction can be made without departing from my invention and I contemplate, as within the scope of my invention, all changes as may come within the terms of the appended claims.

Having thus described my invention, what I declare is new and desire to secure by Letters Patent of the United States is:

1. In a printing machine, the combination with a flat support including a substantially plane surface of considerable length and breadth and an exposure aperture, of a negative holder of elongated shape and including wheels adapted to run over various parts of said plane surface, means adapted to guide the negative holder relatively to the exposure aperture so that when moved on its wheels negative areas may be registered with the exposure aperture and means for positioning the negative guiding means in different positions relative to the exposure aperture.

2. In a printing machine, the combination with a flat support including a large, substantially plane surface and an exposure aperture, of a negative holder of elongated shape and adapted to receive a film having a predetermined number of exposure areas in strip form, anti-friction devices permitting the negative holder to roll over various areas of the plane surface of the flat support, means carried by the support for guiding the negative holder through a predetermined path and means for varying the path by altering the position of the negative holder guiding means.

3. In a printing machine, the combination with a support including an exposure aperture, of a negative holder adapted to be moved to bring negatives over the exposure aperture, a guide for said negative holder including a track pivotally mounted on the support, and an adjustable cam at the other end of the track for adjusting the track upon its pivot and angularly with respect to the exposure aperture.

4. In a printing machine, the combination with a support including an exposure aperture, of a negative holder adapted to be moved to bring negatives over the exposure aperture, a guide for said negative holder comprising a rail apertured at one end, a pin carried by the support adapted to engage said rail aperture, a rotatable post carried by the support and carrying a cam adapted to engage the opposite end of said rail, a handle for adjusting said cam and altering the angular relation of the rail to the exposure aperture whereby the relation of a negative holder guided by the rail may be controlled.

5. In a printing machine, the combination with a flat support including an exposure aperture, a negative holder, wheels on the negative holder on which said holder may move, a guide rail adjustably carried by the flat support, a smooth rail contacting surface on the negative holder adapted to contact with the guide rail, and knurled edges on the negative holder by which it may be moved across the exposure aperture.

6. In a printing machine, the combination with a flat support including an exposure aperture, a negative holder, comprising a pair of hinged glass plates, a latch for holding the plates together and adapted to hold a negative flat in between said plates, a pair of side rails carried by the negative carrier adapted to support the glass plates and to guide movement of the negative carrier, and means carried by the flat support adapted to contact with a side rail to guide the movement of the negative carrier on its wheels, each side rail including a knurled edge for manually moving the carrier and holding it against the guiding means.

7. A negative carrier adapted to be used with printing machines including an exposure aperture in a flat support including a pair of side rails supporting a glass panel, a second glass panel hingedly supported with respect to the first, a plurality of rollers carried by the side rails adapted to support the first mentioned glass plate in a predetermined position, the rollers being positioned inside of the side rails whereby there is a smooth exterior surface on the side rail adapted to guide the negative carrier.

8. A negative carrier adapted to be used with printing machines including an exposure aperture in a flat support including a pair of side rails supporting an elongated panel throughout the length of the two sides, a pair of end supporting plates carrying a second elongated glass plate by its ends only, said end supporting plates being pivotally attached to the side rails at the ends thereof whereby the hingedly mounted glass plate may be swung to and from the plate held by the side rails for loading film therebetween and means included in an end supporting plate for latching the glass plates together.

9. A negative carrier adapted to be used with printing machines including an exposure aperture in a flat support including a pair of side rails supporting an elongated panel throughout the length of the two sides, a pair of end supporting plates carrying a second elongated glass plate by its ends only, said plates being pivotally attached to the side rails whereby said glass plates may be swung to and from each other for loading film therebetween, said end supporting plates including handles and latch elements for moving the second mentioned glass plate and latching it in a closed position.

ROY S. HOPKINS.